United States Patent [19]
Bugnion et al.

[11] Patent Number: 6,075,938
[45] Date of Patent: Jun. 13, 2000

[54] VIRTUAL MACHINE MONITORS FOR SCALABLE MULTIPROCESSORS

[75] Inventors: Edouard Bugnion, Menlo Park; Scott W. Devine; Mendel Rosenblum, both of Stanford, all of Calif.

[73] Assignee: The Board of Trustees of the Leland Stanford Junior University, Palo Alto, Calif.

[21] Appl. No.: 09/095,283

[22] Filed: Jun. 10, 1998

Related U.S. Application Data

[60] Provisional application No. 60/049,244, Jun. 10, 1997.
[51] Int. Cl.$^7$ .............................. G06F 9/455; G06F 13/10
[52] U.S. Cl. .................... 395/500.48; 709/214; 709/301; 710/23; 711/148; 711/153
[58] Field of Search .............................. 395/500.48, 700, 395/500.47, 843; 709/214, 30, 304, 301, 104, 226; 711/6, 141, 122, 130, 148, 153, 203; 710/23

[56] References Cited

U.S. PATENT DOCUMENTS

| | | | |
|---|---|---|---|
| 5,222,224 | 6/1993 | Flynn et al. | 395/425 |
| 5,319,760 | 6/1994 | Mason et al. | 395/400 |
| 5,511,217 | 4/1996 | Nakajima et al. | 395/800 |
| 5,553,291 | 9/1996 | Tanaka et al. | 395/700 |
| 5,893,144 | 4/1999 | Wood et al. | 711/122 |

OTHER PUBLICATIONS

Goldberg, R., Survey of Virtual Machine Research, Computer, pp. 34–45, Jun. 1974.

Creasy, R., The origin of the VM/370 time–sharing system, IBM J. Res. Develop., vol. 25, No. 5, pp. 483–490, 1981.

Rosenblum, M. et al., Implementing efficient fault containment for multiprocessors, Comm. of the ACM, vol. 39, No. 9, 1996.

Chapin, J. et al., Hive: fault containment for shared–memory multiprocessors, Standford Computer Systems Lab Publication, ACM Symposium, Dec. 1995.

Bugnion, E. et al., Design and implementation of DISCO, May 1997.

*Primary Examiner*—Kevin J. Teska
*Assistant Examiner*—Thai Phan

[57] ABSTRACT

The problem of extending modern operating systems to run efficiently on large-scale shared memory multiprocessors without a large implementation effort is solved by a unique type of virtual machine monitor. Virtual machines are used to run multiple commodity operating systems on a scalable multiprocessor. To reduce the memory overheads associated with running multiple operating systems, virtual machines transparently share major data structures such as the operating system code and the file system buffer cache. We use the distributed system support of modem operating systems to export a partial single system image to the users. Two techniques, copy-on-write disks and the use of a special network device, enable transparent resource sharing without requiring the cooperation of the operating systems. This solution addresses many of the challenges facing the system software for these machines. The overheads of the monitor are small and the approach provides scalability as well as the ability to deal with the non-uniform memory access time of these systems. The overall solution achieves most of the benefits of operating systems customized for scalable multiprocessors yet it can be achieved with a significantly smaller implementation effort.

16 Claims, 3 Drawing Sheets

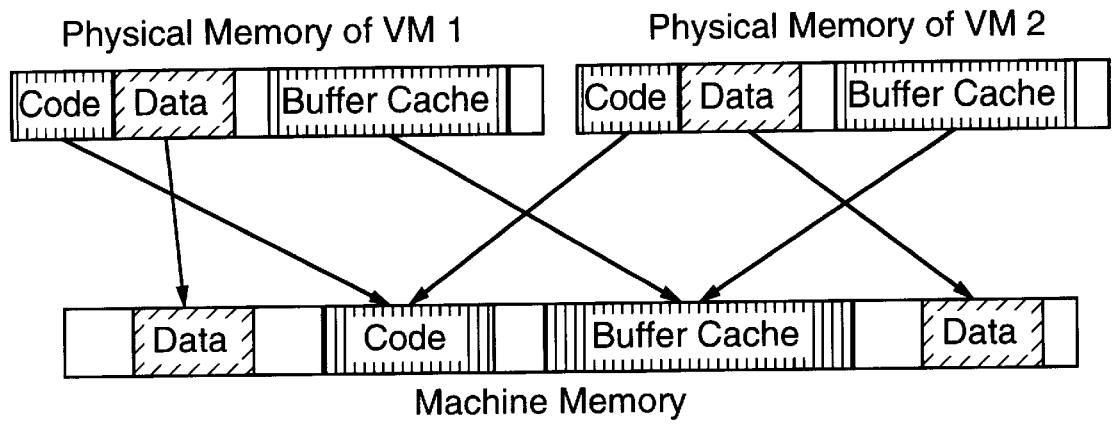
FIG. 4    private    shared    free
FIG. 5
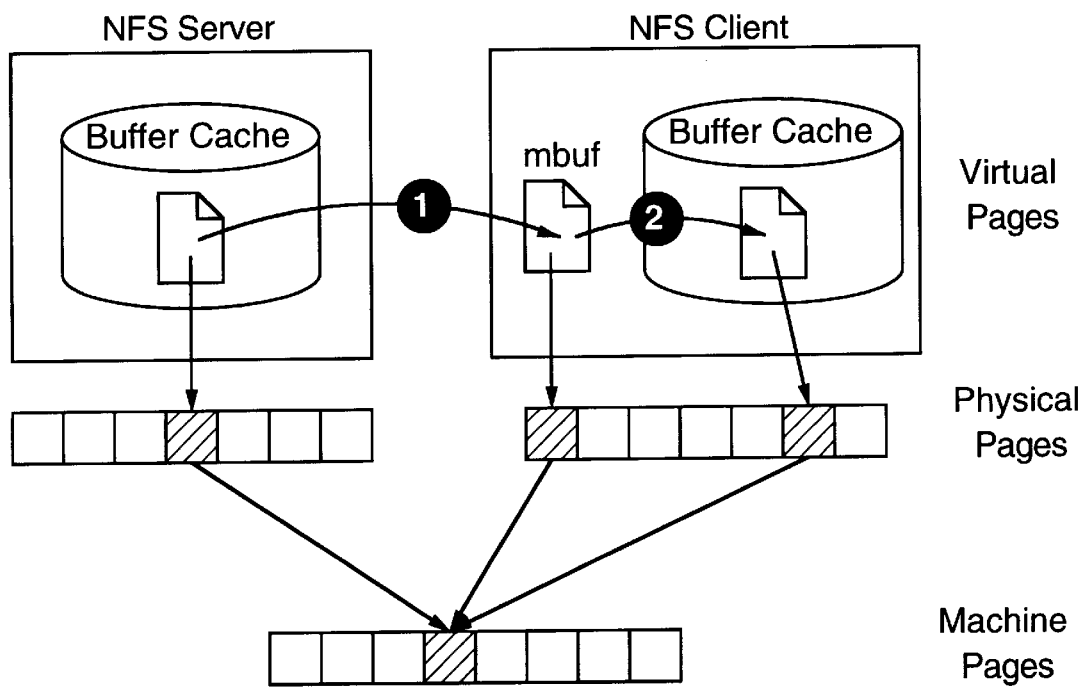

VIRTUAL MACHINE MONITORS FOR SCALABLE MULTIPROCESSORS

This application claims priority from U.S. Provisional Patent Application 60/049,244 filed Jun. 10, 1997, which is incorporated herein by reference.

This invention was made with Government support under Contract No. DABT63-94-C-0054 awarded by ARPA. The Government has certain rights in this invention.

BACKGROUND ART

Scalable computers have moved from the research lab to the marketplace. Multiple vendors are now shipping scalable systems with configurations in the tens or even hundreds of processors. Unfortunately, the operating system (OS) software for these machines has often trailed hardware in reaching the functionality and reliability expected by modern computer users. A major reason for the inability of OS developers to deliver on the promises of these machines is that extensive modifications to the operating system are required to efficiently support scalable shared memory multiprocessor machines, such as cache coherent non-uniform memory access (CC-NUMA) machines. With the size of the system software for modern computers in the millions of lines of code, the OS changes required to adapt them for CC-NUMA machines represent a significant development cost. These changes have an impact on many of the standard modules that make up a modern operating system, such as virtual memory management and the scheduler. As a result, the system software for these machines is generally delivered significantly later than the hardware. Even when the changes are functionally complete, they are likely to introduce instabilities for a certain period of time.

Late, incompatible, and possibly even buggy system software can significantly impact the success of such machines, regardless of the innovations in the hardware. As the computer industry matures, users expect to carry forward their large base of existing application programs. Furthermore, with the increasing role that computers play in today's society, users are demanding highly reliable and available computing systems. The cost of achieving reliability in computers may even dwarf the benefits of the innovation in hardware for many application areas.

In addition, computer hardware vendors that use commodity operating systems such as Microsoft's Windows NT (Custer, 1993) face an even greater problem in obtaining operating system support for their CC-NUMA multiprocessors. These vendors need to persuade an independent company to make changes to the operating system to support the new hardware. Not only must these vendors deliver on the promises of the innovative hardware, they must also convince powerful software companies to port to OS (Perez, 1995). Given this situation, it is not surprising that computer architects frequently complain about the constraints and inflexibility of system software. From their perspective, these software constraints are an impediment to innovation.

Two opposite approaches are currently being taken to deal with the system software challenges of scalable shared-memory multiprocessors. The first one is to throw a large OS development effort at the problem and effectively address these challenges in the operating system. Examples of this approach are the Hive (Rosenblum, 1996) and Hurricane (Unrau, 1995) research prototypes and the Cellular-IRIX operating system recently announced by Silicon Graphics to support its shared memory machine, the Origin2000 (Laudon, 1997). These multi-kernel operating systems handle the scalability of the machine by partitioning resources into "cells" that communicate to manage the hardware resources efficiently and export a single system image, effectively hiding the distributed system from the user. In Hive, the cells are also used to contain faults within cell boundaries. In addition, these systems incorporate resource allocators and schedulers for processors and memory that can handle the scalability and the NUMA aspects of the machine. These designs, however, require significant OS changes, including partitioning the system into scalable units, building a single system image across the units, as well as other features such as fault containment and CC-NUMA management (Verghese, 1996). This approach also does not enable commodity operating systems to run on the new hardware.

The second approach to dealing with the system software challenges of scalable shared-memory multiprocessors is to statically partition the machine and run multiple, independent operating systems that use distributed system protocols to export a partial single system image to the users. An example of this approach is the Sun Enterprise10000 machine that handles software scalability and hardware reliability by allowing users to hard partition the machine into independent failure units each running a copy of the Solaris operating system. Users still benefit from the tight coupling of the machine, but cannot dynamically adapt the partitioning to the load of the different units. This approach favors low implementation cost and compatibility over innovation. Digital's announced Galaxies operating system, a multi-kernel version of VMS, also partitions the machine relatively statically like the Sun machine, with the additional support for segment drivers that allow applications to share memory across partitions. Galaxies reserves a portion of the physical memory of the machine for this purpose.

Virtual Machine Monitors

Virtual machine monitors (VMMs) implement in software a virtual machine identical to the underlying hardware. IBM's VM/370 (IBM, 1972) system, for example, allows the simultaneous execution of independent operating systems by virtualizing all the hardware resources. It can attach I/O devices to single virtual machines in an exclusive mode. VM/370 maps virtual disks to distinct volumes (partitions), and supports a combination of persistent disks and temporary disks. Unfortunately, the advantages of using virtual machine monitors come with certain disadvantages as well. Among the well-documented problems with virtual machines are the overheads due to the virtualization of the hardware resources, resource management, sharing and communication.

Overheads.

The overheads present in traditional virtual machine monitors come from many sources, including the additional exception processing, instruction execution and memory needed for virtualizing the hardware. Operations such as the execution of privileged instructions cannot be safely exported directly to the operating system and must be emulated in software by the monitor. Similarly, the access to I,O devices is virtualized, so requests must be intercepted and remapped by the monitor. In addition to execution time overheads, running multiple independent virtual machines has a cost in additional memory. The code and data of each operating system and application is replicated in the memory of each virtual machine. Furthermore, large memory structures such as the file system buffer cache are also replicated resulting in a significant increase in memory usage. A similar waste occurs with the replication on disk of file systems for the different virtual machines.

Resource Management.

Virtual machine monitors frequently experience resource management problems due to the lack of information available to the monitor to make good policy decisions. For example, the instruction execution stream of an operating system's idle loop or the code for lock busy-waiting is indistinguishable at the monitor's level from some important calculation. The result is that the monitor may schedule resources for useless computation while useful computation may be waiting. Similarly, the monitor does not know when a page is no longer being actively used by a virtual machine, so it cannot reallocate it to another virtual machine. In general, the monitor must make resource management decisions without the high-level knowledge that an operating system would have.

Communication and Sharing.

Finally, running multiple independent operating systems makes sharing and communication difficult. For example under CMS on VM/370, if a virtual disk containing a user's files was in use by one virtual machine it could not be accessed by another virtual machine. The same user could not start two virtual machines, and different users could not easily share files. The virtual machines looked like a set of independent stand-alone systems that simply happened to be sharing the same hardware.

For the above reasons, the idea of virtual machines has been largely disregarded. Nevertheless, rudimentary VMMs remain popular to provide backward compatibility for legacy applications or architectures. Microsoft's Windows 95 operating system (King, 1995) uses a virtual machine to run older Windows 3.1 and DOS applications. DAISY (Ebicoglu, 1997) uses dynamic compilation techniques to run a single virtual machine with a different instruction set architecture than the host processor.

Virtual machine monitors have been recently used to provide fault-tolerance to sensitive applications. The Hypervisor system (Bressoud, 1996) virtualizes only certain resources of the machine, specifically the interrupt architecture. By running the OS in supervisor mode, it disables direct access to I/O resources and physical memory, without having to virtualize them. While this is sufficient to provide fault-tolerance, it does not allow concurrent virtual machines to coexist.

Microkernels

Other system structuring techniques, such as microkernels, are known in the art. Microkernels are an operating system structuring technique with a clean and elegant interface able to support multiple operating system personalities (Accetta, 1986). Exokernel (Engler, 1995; Kaashoek, 1997) is a software architecture that allows application-level resource management. The Exokernel safely multiplexes resources between user-level library operating systems. Exokernel supports specialized operating systems such as ExOS for the Aegis exokernel. These specialized operating systems enable superior performance since they are freed from the general overheads of commodity operating systems. Exokernel multiplexes resources rather than virtualizing them, and cannot, therefore, run commodity operating systems without significant modifications.

The Fluke system (Ford, 1996) uses the virtual machine approach to build modular and extensible operating systems. Recursive virtual machines are implemented by their nested process model, and efficiency is preserved by allowing inner virtual machines to directly access the underlying microkernel of the machine. Ford et al. show that specialized system functions such as checkpointing and migration require complete state encapsulation. Fluke totally encapsulates the state of virtual machines, and can therefore trivially implement these functions.

SUMMARY OF THE INVENTION

It is a primary object of the present invention to overcome the limitations and disadvantages associated with the known operating systems for scalable multiprocessor machines. The present invention provides an alternative approach for constructing the system software for these large computers. Rather than making extensive changes to existing operating systems, an additional layer of software is inserted between the hardware and operating system. This layer acts like a virtual machine monitor in that multiple copies of "commodity" operating systems can be run on a single scalable computer. The monitor also allows these commodity operating systems to efficiently cooperate and share resources with each other. The resulting system contains most of the features of custom scalable operating systems developed specifically for these machines at only a fraction of their complexity and implementation cost. The use of commodity operating systems leads to systems that are both reliable and compatible with the existing computing base.

The unique virtual machine monitor of the present invention virtualizes all the resources of the machine, exporting a more conventional hardware interface to the operating system. The monitor manages all the resources so that multiple virtual machines can coexist on the same multiprocessor. The virtual machine monitor allows multiple copies of potentially different operating systems to coexist on the multiprocessor. Some virtual machines can run commodity uniprocessor or multiprocessor operating systems, and others can run specialized operating systems fine-tuned for specific workloads. The virtual machine monitor schedules the virtual resources (processor and memory) or the virtual machines on the physical resources of the scalable multiprocessor.

The unique virtual machine monitors of the present invention, in combination with commodity and specialized operating systems, form a flexible system software solution for multiprocessor machines. A large CC-NUMA multiprocessor, for example, can be configured with multiple virtual machines each running a commodity operating system such as Microsoft's Windows NT or some variant of UNIX. Each virtual machine is configured with the processor and memory resources that the operating system can effectively handle. The virtual machines communicate using standard distributed protocols to export the image of a cluster of machines.

Although the system looks like a cluster of loosely-coupled machines, the virtual machine monitor uses global policies to manage all the resources of the machine, allowing workloads to exploit the fine-grain resource sharing potential of the hardware. For example, the monitor can move memory between virtual machines to keep applications from paging to disk when free memory is available in the machine. Similarly, the monitor dynamically schedules virtual processors on the physical processors to balance the load across the machine. The use of commodity software leverages the significant engineering effort invested in these operating systems and allows CC-NUMA machines to support their large application base. Since the monitor is a relatively simple piece of code compared to large operating systems, this can be done with a small implementation effort as well as with a low risk of introducing software bugs and incompatibilities.

The approach of the present invention offers two different possible solutions to handle applications whose resource needs exceed the scalability of commodity operating systems. First, a relatively simple change to the commodity operating system can allow applications to explicitly s hare memory regions across virtual machine boundaries. The monitor contains a simple interface to setup these shared regions. The operating system is extended with a special virtual memory segment driver to allow processes running on multiple virtual machines to share memory. For example, a parallel database server could put its buffer cache in such a shared memory region and have query engines running on multiple virtual machines.

Second, the flexibility of the approach supports specialized operating systems for resource-intensive applications that do not need the full functionality of the commodity operating systems. These simpler, specialized operating systems better support the needs of the applications and can easily scale to the size of the machine. For example, a virtual machine running a highly-scalable lightweight operating system such as Puma (Shuler, 1995) allows large scientific applications to scale to the size of the machine. Since the specialized operating system runs in a virtual machine, it can run alongside commodity operating systems running standard application programs. Similarly, other important applications such as database and web servers could be run in highly-customized operating systems such as database accelerators.

Besides the flexibility to support a wide variety of workloads efficiently, the approach of the present invent ion has a number of additional advantages over other system software designs targeted for CC-NUMA machines. Running multiple copies of an operating system handles the challenges presented by CC-NUMA machines such as scalability and fault-containment. The virtual machine becomes the unit of scalability. With this approach, only the monitor itself and the distributed systems protocols need to scale to the size of the machine. The simplicity of the monitor makes this task easier than building a scalable operating system.

The virtual machine also becomes the unit of fault containment where failures in the system software can be contained in the virtual machine without spreading over the entire machine. To provide hardware fault-containment, the monitor itself must be structured into cells. Again, the simplicity of the monitor makes this easier than to protect a full-blown operating system against hardware faults.

NUMA memory management issues can also be handled by the monitor, effectively hiding the entire problem from the operating systems. With the careful placement of the pages of a virtual machine's memory and the use of dynamic page migration and page replication, the monitor can export a more conventional view of memory as a uniform memory access (UMA) machine. This allows the non-NUMA-aware memory management policies of commodity operating systems to work well, even on a NUMA machine.

Besides handling CC-NUMA multiprocessors, the approach of the present invention also inherits all the advantages of traditional virtual machine monitors. Many of these benefits are still appropriate today and some have grown in importance. By exporting multiple virtual machines, a single CC-NUMA multiprocessor can have multiple different operating system s simultaneously running on it. Older versions of the system software can be kept around to provide a stable platform for keeping legacy applications running. Newer versions can be staged in carefully with critical applications residing on the older operating systems until the newer versions have proven themselves. This approach provides an excellent way of introducing new and innovative system software while still providing a stable computing base for applications that favor stability over innovation.

In one aspect of the invention, a computational system is provided that comprises a multiprocessor hardware layer, a virtual machine monitor layer, and a plurality of operating systems. The multiprocessor hardware layer comprises a plurality of computer processors, a plurality of physical resources associated with the processors, and an interconnect providing mutual communication between the processors and resources. The virtual machine monitor (VMM) layer executes directly on the hardware layer and comprises a resource manager that manages the physical resources of the multiprocessor, a processor manager that manages the computer processors, and a hardware emulator that creates and manages a plurality of virtual machines. The operating systems execute on the plurality of virtual machines and transparently share the plurality of computer processors and physical resources through the VMM layer. In a preferred embodiment, the VMM layer further comprises a virtual network device providing communication between the operating systems executing on the virtual machines, and allowing for transparent sharing optimizations between a sender operating system and a receiver operating system. In addition, the resource manager maintains a global buffer cache that is transparently shared among the virtual machines using read-only mappings in portions of an address space of the virtual machines. The VMM layer also maintains copy-on-write disks that allow virtual machines to transparently share main memory resources and disk storage resources, and performs dynamic page migration/replication that hides distributed characteristics of the physical memory resources from the operating systems. The VMM layer may also comprise a virtual memory resource interface to allow processes running on multiple virtual machines to share memory.

Comparison with System Software for Scalable Shared Memory Machines

The present invention is a unique combination of the advantages of both the OS-intensive and the OS-light approaches, without the accompanying disadvantages. In particular, the present invention allows commodity and other operating systems to be run efficiently on multiprocessors with little or no modification. Thus, the present invention does not require a major OS development effort that is required by the known OS-intensive approaches. Yet, because it can share resources between the virtual machines and supports highly dynamic reconfiguration of the machine, the present invention enjoys all the performance advantages of OS-intensive approaches that have been adapted to the multiprocessor hardware. The present invention, therefore, does not suffer from the performance disadvantages of the OS-light approaches, such as Hive and Cellular-IRIX, that are hard-partioned and do not take full advantage of the hardware resources of the scalable multiprocessor. Yet, the present invention enjoys the advantages of the OS-light approaches because it is independent of any particular OS, and can even support different operating systems concurrently. In addition, the present invention is capable of gradually getting out of the way as the OS improves. Operating systems with improved scalability can just request larger virtual machines that manage more of the machiners resources. The present invention, therefore, provides a low-cost solution that enables a smooth transition and maintains compatibility with commodity operating systems.

Comparison with Virtual Machine Monitors

The present invention is implemented as a unique type of virtual machine monitor specially designed for scalable multiprocessors and their particular issues. The present invention differs from VM/370 and other virtual machines in several respects. Among others, it supports scalable shared-memory multiprocessors, handles modern operating systems, and transparently shares capabilities of copy-on-write disks and the global buffer cache. Whereas VM/370 mapped virtual disks to distinct volumes (partitions), the present invention has the notion of shared copy-on-write disks.

In contrast with DAISY, which uses dynamic compilation techniques to run a single virtual machine with a different instruction set architecture than the host processor, the present invention exports the same instruction set as the underlying hardware and can therefore use direct execution rather than dynamic compilation.

The Hypervisor system virtualizes only the interrupt architecture of the machine. While this is sufficient to provide fault-tolerance, it does not allow concurrent virtual machines to coexist, as the present invention does.

Comparison with Other System Software Structuring Techniques

As an operating system structuring technique, the present invention is similar in some respects to a microkernel with an unimaginative interface. Rather than developing the clean and elegant interface used by microkernels, the present invention simply mirrors the interface of the raw hardware.

The present invention differs from Exokernel in that it virtualizes resources rather than multiplexing them, and can therefore run commodity operating systems without significant modifications.

Conclusion

The present invention has overcome many of the problems associated with traditional virtual machines. In the present invention, the overheads imposed by the virtualization are modest both in terms of processing time and memory footprint. The present invention uses a combination of innovative emulation of the DMA engine and standard distributed file system protocols to support a global buffer cache that is transparently shared across all virtual machines. The approach provides a simple solution to the scalability, reliability and NUMA management problems otherwise faced by the system software of large-scale machines.

BRIEF DESCRIPTION OF THE DRAWING FIGURES

FIG. 1 is a schematic diagram illustrating the architecture of a computer system according to the invention. Disco, a virtual machine monitor, is a software layer between a multiprocessor hardware layer and multiple virtual machines that run independent operating systems and application programs.

FIG. 2 is a schematic diagram illustrating transparent page replication according to the present invention. Disco uses the physical-to-machine mapping to replicate user and kernel pages. Virtual pages from VCPUs 0 and 1 both map the same physical page of their virtual machine. However, Disco transparently maps each virtual page to a machine page replica that is located on the local node.

FIG. 3 is a schematic diagram illustrating major data structures according to the present invention.

FIG. 4 is a schematic diagram illustrating memory sharing according to the present invention. Read-only pages brought in from disk, such as the kernel text and the buffer cache, can be transparently shared between virtual machines. This creates in machine memory a global buffer cache shared across virtual machines and helps reduce the memory footprint of the system.

FIG. 5 is a schematic diagram illustrating an example of transparent sharing of pages over NFS according to the present invention. The diagram shows the case when the NFS reply, to a read request, includes a data page. (1) The monitor's networking device remaps the data page from the source's machine address space to the destination's. (2) The monitor remaps the data page from the driver's mbuf to the client's buffer cache. This remap is initiated by the operating system through a monitor call.

DETAILED DESCRIPTION

To demonstrate the approach of the present invention, we discuss for illustrative purposes an embodiment of the invention that combines commodity operating systems, not originally designed for large-scale multiprocessors, to form a high performance system software base. This embodiment, called Disco, will be described as implemented on the Stanford FLASH shared memory multiprocessor (Kuskin, 1994), an experimental cache coherent non-uniform memory architecture (CC-NUMA) machine. The FLASH multiprocessor consists of a collection of nodes each containing a processor, main memory, and I/O devices. The nodes are connected together with a high-performance scalable interconnect. The machines use a directory to maintain cache coherency, providing to the software the view of a shared-memory multiprocessor with non-uniform memory access times. Although written for the FLASH machine, the hardware model assumed by Disco is also available on a number of commercial machines including the Convex Exemplar (Brewer, 1997), Silicon Graphics Origin2000 (Laudon, 1997), Sequent NUMAQ (Lovett, 1996), and DataGeneral NUMALiine. Accordingly, Disco illustrates the fundamental principles of the invention which may be adapted by those skilled in the art to implement the invention on other similar machines.

Disco contains many features that reduce or eliminate the problems associated with traditional virtual machine monitors. Specifically, it minimizes the overhead of virtual machines and enhances the resource sharing between virtual machines running on the same system. Disco allows operating systems running on different virtual machines to be coupled using standard distributed systems protocols such as TCP/IP and NFS. It also allows for efficient sharing of memory and disk resources between virtual machines. The sharing support allows Disco to maintain a global buffer cache which is transparently shared by all the virtual machines, even when the virtual machines communicate through standard distributed protocols.

Figure 1:
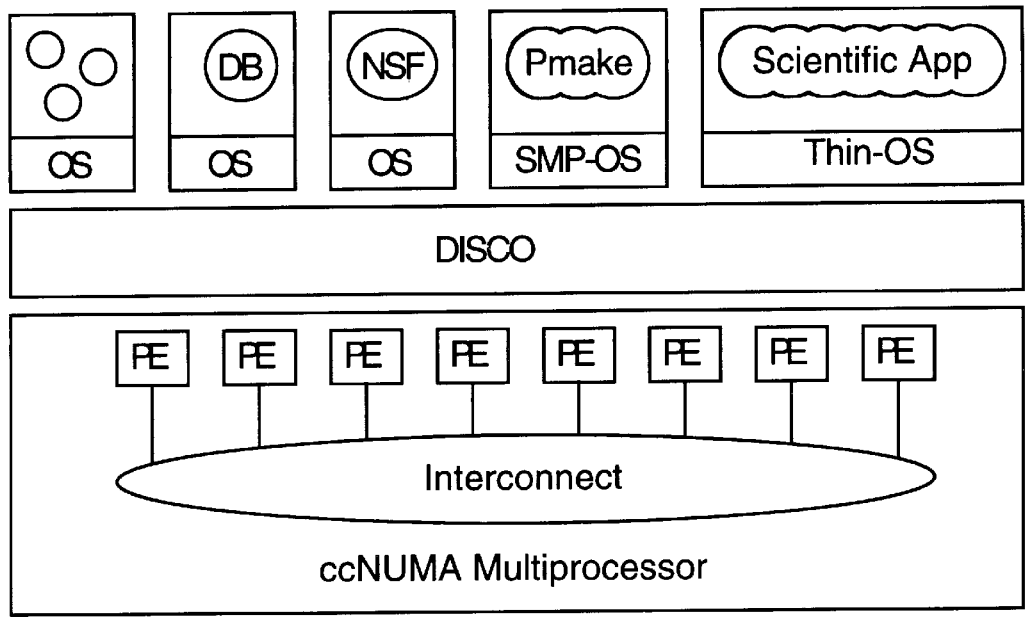

FIG. 1 shows how the virtual machine monitor allows multiple copies of potentially different operating systems to coexist. In this figure, five virtual machines coexist on the multiprocessor. Some virtual machines run commodity uniprocessor or multiprocessor operating systems, and others run specialized operating systems fine-tuned for specific workloads. The virtual machine monitor schedules the virtual resources (processor and memory) or the virtual machines on the physical resources of the scalable multiprocessor.

Our experiments with realistic workloads on a detailed simulator of the FLASH machine show that Disco achieves its goals. With a few simple modifications to an existing commercial operating system, the basic overhead of virtualization ranges from 3% to 16% for all our uniprocessor workloads. We show that a system with eight virtual machines can run some workloads 40% faster than on a commercial symmetric multiprocessor operating system by increasing the scalability of the system software, without substantially increasing the system's memory footprint. Finally, we show that page placement and dynamic page migration and replication allow Disco to hide the NUMA-ness of the memory system, improving the execution time by up to 37%. Early experiments on a uniprocessor SGI machine confirm the simulation-based results.

DESIGN AND IMPLEMENTATION OF DISCO

This section describes the design and implementation of Disco. We first describe the key abstractions exported by Disco. We then describe the implementation of these abstractions. Finally, we discuss the operating system requirements to run on top of Disco.

Disco's Interface

Disco runs multiple independent virtual machines simultaneously on the same hardware by virtualizing all the resources of the machine. Each virtual machine can run a standard operating system that manages its virtualized resources independently of the rest of the system.
Processors.

To match the FLASH machine, the virtual CPUs of Disco provide the abstraction of a MIPS R10000 processor. Disco correctly emulates all instructions, the memory management unit, and the trap architecture of the processor allowing unmodified applications and existing operating systems to run on the virtual machine. Though required for the FLASH machine, the choice of the processor was unfortunate for Disco since the R10000 does not support the complete virtualization of the kernel virtual address space. Below we detail the OS changes needed to allow kernel-mode code to run on Disco.

Besides the emulation of the MIPS processor, Disco extends the architecture to support efficient access to some processor functions. For example, frequent kernel operations such as enabling and disabling CPU interrupts and accessing privileged registers can be performed using load and store instructions on special addresses. This interface allows operating systems tuned for Disco to reduce the overheads caused by trap emulation.
Physical Memory.

Disco provides an abstraction of main memory residing in a contiguous physical address space starting at address zero. This organization was selected to match the assumptions made by the operating system.

Since most commodity operating systems are not designed to effectively manage the nonuniform memory of the FLASH machine, Disco uses dynamic page migration and replication to export a nearly uniform memory access time memory architecture to the software. This allows a non-NUMA aware operating system to run well on FLASH without the changes needed for NUMA memory management.
I/O Devices.

Each virtual machine is created with a specified set of I/O devices, such as disks, network interfaces, periodic interrupt timers, clock, and a console. As with processors and physical memory, most operating systems assume exclusive access to their I/O devices, requiring Disco to virtualize each I/O device. Disco must intercept all communication to and from I/O devices to translate or emulate the operation.

Because of their importance to the overall performance and efficiency of the virtual machine, Disco exports special abstractions for the SCSI disk and network devices. Disco virtualizes disks by providing a set of virtual disks that any virtual machine can mount. Virtual disks can be configured to support different sharing and persistency models. A virtual disk can either have modifications (i.e. disk write requests) stay private to the virtual machine or they can be visible to other virtual machines. In addition, these modifications can be made persistent so that they survive the shutdown of the virtual machine or non-persistent so that they disappear with each reboot.

To support efficient communication between virtual machines, as well as other real machines, the monitor virtualizes access to the networking devices of the underlying system. Each virtual machine is assigned a distinct link-level address on an internal virtual subnet handled by Disco. Besides the standard network interfaces such as Ethernet and FDDI, Disco supports a special network interface that can handle large transfer sizes without fragmentation. For communication with the world outside the machine, Disco acts as a gateway that uses the network interfaces of the machine to send and receive packets.

Implementation of Disco

Like most operating systems that run on shared-memory multiprocessors, Disco is implemented as a multi-threaded shared memory program. Disco differs from existing systems in that careful attention has been given to NUMA memory placement, cache-aware data structures, and inter-processor communication patterns. For example, Disco does not contain linked lists or other data structures with poor cache behavior. The small size of Disco, about 13,000 lines of code, allows for a higher degree of tuning than is possible with million line operating systems.

To improve NUMA locality, the small code segment of Disco, currently 72KB, is replicated into all the memories of FLASH machine so that all instruction cache misses can be satisfied from the local node. Machine-wide data structures are partitioned so that the parts that are accessed only or mostly by a single processor are in a memory local to that processor.

For the data structures accessed by multiple processors, very few locks are used and wait-free synchronization (Herlihy, 1991) using the MIPS LL/SC instruction pair is heavily employed. Disco communicates through shared-memory in most cases. It uses inter-processor interrupts for specific actions that change the state of a remote virtual processor, for example TLB shootdowns and posting of an interrupt to a given virtual CPU. Overall, Disco is structured more like a highly tuned and scalable SPLASH application (Woo, 1995) than like a general-purpose operating system.
Virtual CPUs Like previous virtual machine monitors, Disco emulates the execution of the virtual CPU by using direct execution on the real CPU. To schedule a virtual CPU, Disco sets the real machines' registers to those of the virtual CPU and jumps to the current PC of the virtual CPU. By using direct execution, most operations run at the same speed as they would on the raw hardware. The challenge of using direct execution is the detection and fast emulation of those operations that cannot be safely exported to the virtual machine. These operations are primarily the execution of privileged instructions performed by the operating system such as TLB modification, and the direct access to physical memory and I/O devices.

For each virtual CPU, Disco keeps a data structure that acts much like a process table entry in a traditional operating system. This structure contains the saved registers and other state of a virtual CPU when it is not scheduled on a real CPU. To perform the emulation of privileged instructions, Disco additionally maintains the privileged registers and TLB contents of the virtual CPU in this structure.

Disco contains a simple scheduler that allows the virtual processors to be time-shared across the physical processors of the machine. The scheduler cooperates with the memory management to support affinity scheduling that increases data locality. For virtual machines with multiple CPUs, Disco uses gang scheduling of the virtual CPUs of the same virtual machine to ensure realistic execution interleaving for the software running on the virtual machines. Disco assigns special semantics to the reduced power consumption mode of the MIPS processor. This mode is used by the operating system whenever the system is idle. Disco will deschedule the virtual CPU until the mode is cleared or an interrupt is posted.

On the MIPS processor, Disco runs in kernel mode with full access to the machine's hardware. When control is given to a virtual machine to run, Disco puts the processor in supervisor mode if running the virtual machine's operating system, and in user mode otherwise. Supervisor mode allows the operating system to use a protected portion of the address space (the supervisor segment) but does not give access to privileged instructions or physical memory. Applications and kernel code can however still be directly executed since Disco emulates the operations that cannot be issued in supervisor mode. When a trap such as page fault, system call, or bus error occurs, the processor traps to the monitor that emulates the effect of the trap on the currently scheduled virtual processor. This is done by updating the privileged registers of the virtual processor and jumping to the virtual machine's trap vector.

Disco maintains all the privileged registers in the VCPU structure. Privileged instructions that change the state of privileged registers are emulated by the monitor . The monitor updates the privileged registers as dictated by the instruction.

In order to emulate the privileged instructions that modify and query the state of the TLB, Disco maintains a software TLB. This structure holds the untranslated TLB entrie s that the kernel has entered in the TLB. In order to make lookup in the software TLB fast, Disco implements a direct mapped TLB for the random entries.

Hardware interrupts are handled directly by the VMM through its own device drivers. The VMM posts an interrupt to the virtual machine when the operation that it has requested completes. The mechanism that posts an interrupt to a vCPU of a VM must execute on the physical processor that currently runs that VCPU (if any) since it alters the state of the VCPU. The altered state includes the status and cause registers, as well as the exception program counter (EPC). The PC is set to the start of the VM's exception handler.

Virtual Physical Memory

Disco provides an abstraction of main memory residing in a contiguous physical address space starting at address zero. This organization was selected to match the assumptions made by the operating systems we run on Disco. It eliminates the need to change the operating system to support the discontinuous memory layout in the physical address space of the FLASH machine.

Since most commodity operating systems are not designed to effectively manage the nonuniform memory of the FLASH machine, Disco uses dynamic page migration and replication to export a nearly uniform memory access time memory architecture to the software. This allows a non-NUMA aware operating system to run well on FLASH without the changes needed for NUMA memory management.

To virtualize physical memory, Disco adds a level of address translation and maintains physical-to-machine address mappings. Virtual machines use physical addresses that have memory starting at address zero and continuing for the size of virtual machine's memory. Disco maps these physical addresses to the 40 bit machine addresses used by the memory system of the FLASH machine.

Disco performs this physical-to-machine translation using the software-reloaded translation-lookaside buffer (TLB) of the MIPS processor. (A similar technique is applied on processors with a hardware-reloaded TmB such as the Intel x86. The virtual machine monitor manages the page table and prevents the virtual machine from directly inserting entries into it.) When an operating system attempts to insert a virtual-to-physical mapping into the TLB, Disco emulates this operation by translating the physical address into the corresponding machine address and inserting this corrected TLB entry into the TLB. Once the TLB entry has been established, memory references through this mapping are translated with no additional overhead by the process or.

To quickly compute the corrected TLB entry, Disco keeps a per virtual machine pmap data structure that contains one entry for each physical page of a virtual machine. Each pmap entry contains a pre-computed TLB entry that references the physical page location in real memory. Disco merges that entry with the protection bits of the original entry before inserting it into the TLB. For example, a writeable mapping is only inserted in the TLB when the virtual machine requests it and the page is not marked copy-on-write. The pmap entry also contains backmaps pointing to the virtual addresses that are used to invalidate mappings from the TLB when a page is taken away from the virtual machine by the monitor.

On MIPS processors, all user mode memory references must be translated by the TLB but kernel mode references used by operating systems may directly access physical memory and I/O devices through the unmapped segment of the kernel virtual address space. Many operating systems place both the operating system code and data in this segment. Unfortunately, the MIPS architecture bypasses the TLB for this direct access segment making it impossible for Disco to efficiently remap these addresses using the TLB. Having each operating system instruction trap into the monitor would lead to unacceptable performance. We were therefore required to re-link the operating system code and data to a mapped region of the address space. This problem seems unique to MIPS as other architectures such as Alpha can remap these regions using the TLB.

The ccNUMA management and the virtual I/O devices need to transparently change the physical-to-machine mapping. The pmap handles this functionality. It first invalidates any TLB entries mapping the old machine page and then copies the page to a local machine page.

Supporting the unmapped regions in the TLB and flushing the TLB on virtual CPU switches results in an increase in the number of TLB misses for a given workload. In addition, each TLB miss is now more expensive because of the emulation of the trap architecture, the emulation of privileged instructions in the operating system's TLB-miss handler, and the remapping of physical addresses described above. To lessen the performance impact, Disco caches recent virtual-to-machine translations in a second-level software TLB. On each TLB miss, Disco's TLB miss handler first consults the second-level TLB. If it finds a matching virtual address it can simply place the cached mapping in the TLB, otherwise it forwards the TLB miss exception to the operating system running on the virtual machine. The effect of this optimization is that virtual machines appear to have much larger TLBs than the MIPS processors.

The MIPS processors tag each TLB entry with an address space identifier (ASID) to avoid having to flush the TLB on MMU context switches. To avoid the complexity of virtualizing the ASIDs, Disco flushes the machine's TLB when scheduling a different virtual CPU on a physical processor. This approach speeds up the translation of the TLB entry since the ASID field provided by the virtual machine can be used directly.

ccNUMA Memory Management

Besides providing fast translation of the virtual machine's physical addresses to real machine pages, the memory management part of Disco must also deal with the allocation of real memory to virtual machines. This is a particularly important task on ccNUMA machines since the commodity operating system is depending on Disco to deal with the non-uniform memory access times. Disco must try to allocate memory and schedule virtual CPUs so that cache misses generated by a virtual CPU will be satisfied from local memory rather than having to suffer the additional latency of a remote cache miss. To accomplish this, Disco implements a dynamic page migration and page replication system (Bolosky, 1989; Cox, 1989) that moves or replicates pages to maintain locality between a virtual CPU's cache misses and the memory pages to which the cache misses occur.

Disco targets machines that maintain cache-coherence in hardware. On these machines, NUMA memory management is strictly an optimization that enhances data locality and is not required for correct execution. Disco uses a robust policy that moves only pages that will likely result in an eventual performance benefit (Verghese, 1996). Pages that are heavily accessed by only one node are migrated to that node. Pages that are primarily read-shared are replicated to the nodes most heavily accessing them. Pages that are write-shared are not moved because remote accesses cannot be eliminated for all processors. Disco's policy also limits the number of times a page can move to avoid excessive overheads.

Figure 2:
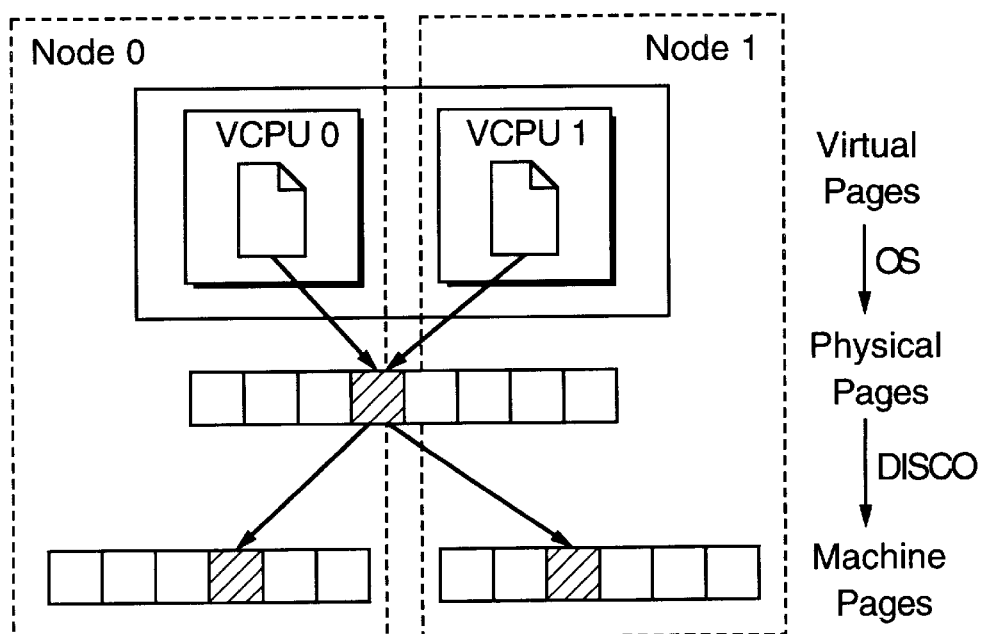

Disco's page migration and replication policy is driven by the cache miss counting facility provided by the FLASH hardware. FLASH counts cache misses to each page from every physical processor. Once FLASH detects a hot page, the monitor chooses between migrating and replicating the hot page based on the cache miss counters. To migrate a page, the monitor transparently changes the physical-to-machine mapping. It first invalidates all TLB entries mapping the old machine page and then copies the data to a local machine page. To replicate a page, the monitor must first downgrade all TLB entries mapping the machine page to ensure read-only accesses. It then copies the page to the local node and updates the relevant TLB entries mapping the old machine page. The resulting configuration after replication is shown in FIG. 2. In this example, two different virtual processors of the same virtual machine logically read-share the same physical page, but each virtual processor accesses a local copy.

Disco maintains a memmap data structure that contains an entry for each real machine memory page. To perform the necessary TLB shootdowns during a page migration or replication, the memmap entry contains a list of the virtual machines using the page and the virtual addresses used to access them. A memmap entry also contains pointers to any replicated copies of the page.

Figure 3:
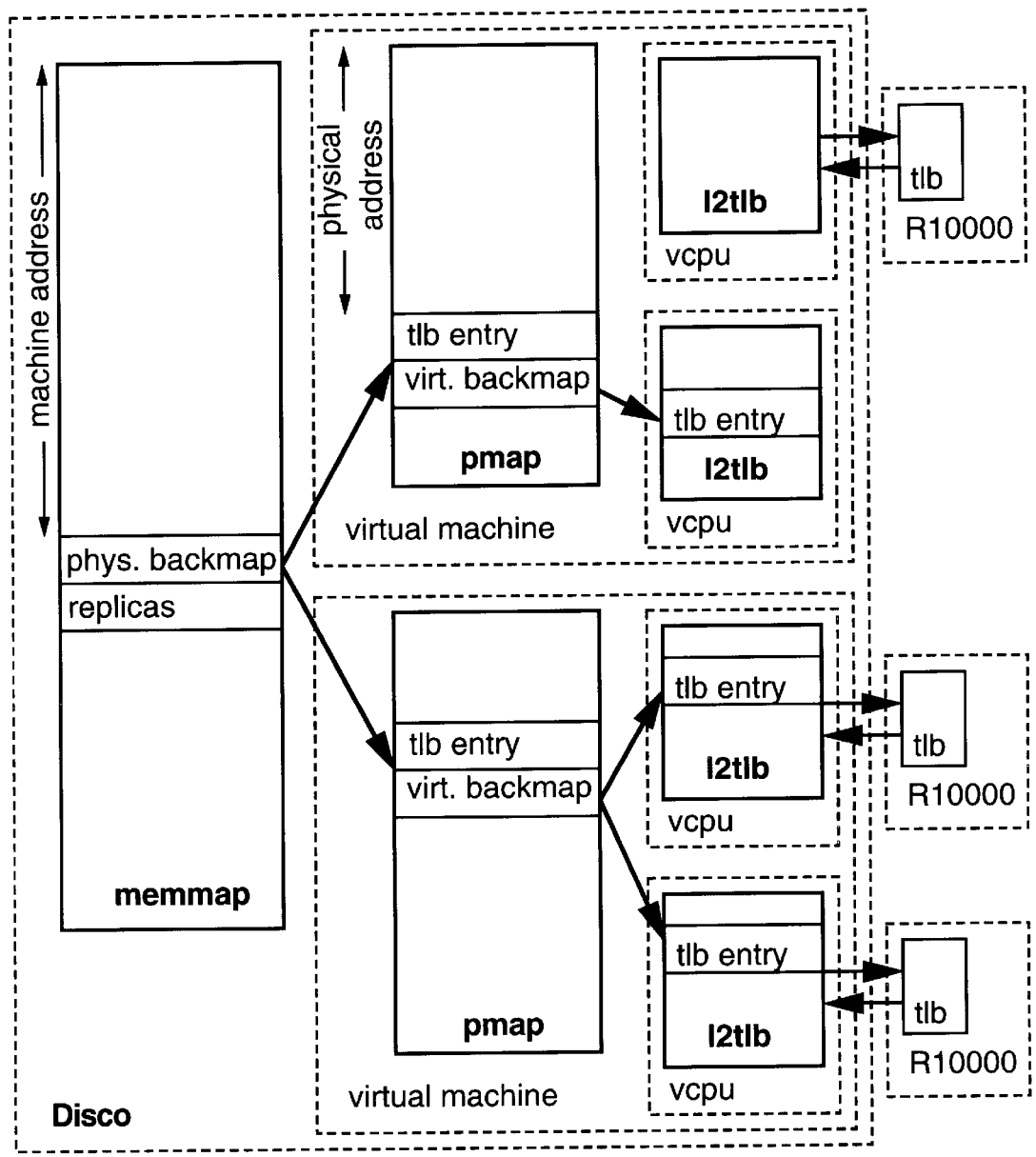

FIG. 3 summarizes the key data structures of Disco's memory management and their interactions as described above. We discuss two examples of operations on these data structures. The first example describes the impact of a TLB miss. If the virtual address is not in the hardware TLB of the MIPS R10000, Disco's TLB miss handler will first check if the TLB entry is present in the l2tlb (second-level TLB) of the vcpu (virtual processor).

If this is not the case, Disco will forward the exception to the virtual machine. The operating system's TLB miss handler will contain a TLB write instruction that is emulated by Disco. Disco uses the physical address specified by the operating system to index into the pmap to determine the corresponding machine address, allocating one if necessary. The memmap is used to determine which replica is closest to the physical processor that currently schedules the vcpu. Finally, the virtual-to-machine translation is inserted into the l2tlb and the R10000 TLB.

The second example shows the impact of a page migration action. The hardware of the FLASH machine determines that a given machine page is "hot" and Disco determines that it is suitable for migration. The transparent migration requires that all mappings that point to that page be removed from all processors. The entry in the memmap of that machine address contains the list of the pmap entries that refer to the page. The pmap entry contains a backmap to the virtual address and a bitmask of vcpus that possibly have the mapping to that machine address. Finally, all matching entries in the relevant l2tlbs and R10000 TLBs are invalidated before the page is actually migrated.

Virtual I/O Devices

To virtualize access to I/O devices, Disco intercepts all device accesses from the virtual machine and forwards them to the physical devices. Although it would be possible for Disco to interpose on the programmed input/output (PIOs) from the operating system device drivers and emulate the functionality of the hardware device, this approach would be complex, specific to each device, and require many traps. We found it was much cleaner to simply add special device drivers into the operating system. Each Disco device defines a monitor call used by the device driver to pass all command arguments in a single trap.

Devices such as disks and network interfaces include a DMA map as part of their arguments. A DMA map consists of a list of physical address-length pairs that specify the memory source or destination of the I/O operation. Disco must intercept such DMA requests to translate the physical addresses specified by the operating systems into machine addresses. Disco's device drivers then interact directly with the physical device. For devices accessed by a single virtual machine, Disco only needs to guarantee the exclusivity of this access and translate the physical memory addresses of the DMA, but does not need to virtualize the I/O resource itself.

The interposition on all DMA requests offers an opportunity for Disco to share disk and memory resources among virtual machines. Disco's copy-on-write disks allow virtual machines to share both main memory and disk storage resources. Disco's virtual network devices allow virtual machines to communicate efficiently. The combination of these two mechanisms, detailed below, allows Disco to support a system-wide cache of disk blocks in memory that can be transparently shared between all the virtual machines.

Copy-on-write Disks

Disco intercepts every disk request that DMAs data into memory. When a virtual machine requests to read a disk block that is already in main memory, Disco can process the request without going to disk. Furthermore, if the disk request is a multiple of the machine's page size, Disco can process the DMA request by simply mapping the page into the virtual machine's physical memory. In order to preserve the semantics of a DMA operation, Disco maps the page read-only into the destination address page of the DMA. Attempts to modify a shared page will result in a copy-on-write fault handled internally by the monitor.

Using this mechanism, multiple virtual machines accessing a shared disk end up sharing machine memory, The copy-on-write semantics means that the virtual machine is unaware of the sharing with the exception that disk requests can finish nearly instantly. Consider an environment running multiple virtual machin es for scalability purposes. All the virtual machines can share the same root disk containing the kernel and application programs. The code and other read-only data stored on the disk will be DMA-ed into memory by the first virtual machine that accesses it. Subsequent requests will simply map the page specified to the DMA engine with out transferring any data. The result is shown in FIG. 4 where all virtual machines share these read-only pages. Effectively we get the memory sharing patterns expected of a single shared memory multiprocessor operating system even though the system runs multiple independent operating systems.

To preserve the isolation of the virtual machines, disk writes must be kept private to the virtual machine that issues them. Disco logs the modified sectors so that the copy-on-write disk is never actually modified. For persistent disks, these modified sectors would be logged in a separate disk partition managed by Disco. To simplify our implementation, we only applied the concept of copy-on-write disks to non-persistent disks and kept the modified sectors in main memory whenever possible.

The implementation of this memory and disk sharing feature of Disco uses two data structures. For each disk device, Disco maintains a B-Tree indexed by the range of disk sectors being requested. This B-Tree is used to find the machine memory address of the sectors in the global disk cache. A second B-Tree is kept for each disk and virtual machine to find any modifications to the block made by that virtual machine. We used B-Trees to efficiently support queries on ranges of sectors (Cormen, 1990).

The copy-on-write mechanism is used for file systems such as the root disk whose modifications as not intended to be persistent or shared across virtual machines. For persistent disks such as the one containing user files, Disco enforces that only a single virtual machine can mount the disk at any given time. As a result, Disco does not need to virtualize the layout of the disk. Persistent disks can be accessed by other virtual machines through a distributed file system protocol such as NFS.

Virtual Network Interface

The copy-on-write mechanism for disks allows the sharing of memory resources across virtual machines, but does not allow virtual machines to communicate with each other. To communicate, virtual machines use standard distributed protocols. For example, virtual machines share files through NFS. As a result, shared data will end up in both the client's and server's buffer cache. Without special attention, the data will be duplicated in machine memory. We designed a virtual subnet managed by Disco that allows virtual machines to communicate with each other, while avoiding replicated data whenever possible.

The virtual subnet and networking interfaces of Disco also use copy-on-write mappings to reduce copying and to allow for memory sharing. The virtual device uses ethernet-like addresses and does not limit the maximum transfer unit (MTU) of packets. A message transfer sent between virtual machines causes the DMA unit to map the page read-only into both the sending and receiving virtual machine's physical address spaces. The virtual network interface accepts messages that consist of scattered buffer fragments. Our implementation of the virtual network in Disco and in the operating system's device driver always respects the data alignment of the outgoing message so that properly aligned message fragments that span a complete page are always remapped rather than copied.

Using this mechanism, a page of data read from disk into the file cache of a file server running in one virtual machine can be shared with client programs that request the file using standard distributed file system protocols such as NFS.

FIG. 5 illustrates the case when the NFS reply to read request includes a data page. In (1) the monitor's networking device remaps the data page from the source's machine address space to the destination's. In (2) the monitor remaps the data page from the driver's mbuf to the clients buffer cache. This remap is initiated by the operating system through a monitor call. As a result, Disco supports a global disk cache even when a distributed file system is used to connect the virtual machines. In practice, the combination of copy-on-write disks and the access to persistent data through the specialized network device provides a global buffer cache that is transparently shared by independent virtual machines.

As a result, all read-only pages can be shared between virtual machines. Although this reduces the memory footprint, this may adversely affect data locality as most sharers will access the page remotely. However, Disco's page replication policy selectively replicates the few "hot" pages that suffer the most cache misses. Pages are therefore shared whenever possible and replicated only when necessary to improve performance.

Running Commodity Operating Systems

The "commodity" operating system we run on Disco is IRIX, a UNIX SVR4 based operating system from Silicon Graphics. Disco is however independent of any specific operating system and we plan to support others such as Windows NT and Linux.

In their support for portability, modern operating systems present a hardware abstraction level (HAL) that allows the operating system to be effectively "ported" to run on new platforms. Typically the HAL of modern operating systems changes with each new version of a machine while the rest of the system can remain unchanged. Our experience has been that relatively small changes to the HAL can reduce the overhead of virtualization and improve resource usage.

Most of the changes made in IRIX were part of the HAL. (Unlike other operating systems, IRIX does not contain a documented HAL interface. In this paper, the HAL includes all the platform and processor-specific procedures of the operating system.) All of the changes were simple enough that they are unlikely to introduce a bug in the software and did not require a detailed understanding of the internals of IRIX. Although we performed these changes at the source level as a matter of convenience, many of them were simple enough to be performed using binary translation or augmentation techniques.

Necessary Changes for MIPS Architecture

Virtual processors running in supervisor mode cannot efficiently access the KSEG0 segment of the MIPS virtual address space, that always bypasses the TLB. Unfortunately, many MIPS operating systems including IRIX 5.3 place the kernel code and data in the KSEG0 segment. As a result, we needed to relocate the unmapped segment of the virtual machines into a portion of the mapped supervisor segment of the MIPS processor. This allow ed Disco to emulate the direct memory access efficiently using the TLB. The need for relocating the kernel appears to be unique to MIPS and is not present in other modem architecture such as Alpha, x86, SPARC, and PowerPC.

Making these changes to IRIX required changing two header files that describe the virtual address space layout, changing the linking options, as well as 15 assembly statements in locore.s. Unfortunately, this meant that we needed to re-compile and re-link the IRIX kernel to run on Disco.

Device Drivers

Disco's monitor call interface reduces the complexity and overhead of accessing I/O devices. We implemented UART, SCSI disks, and ethernet drivers that match this interface. Since the monitor call interface provides the view of an idealized device, the implementation of these drivers was straightforward. Since kernels are normally designed to run with different device drivers, this kind of change can be made without the source and with only a small risk of introducing a bug. The complexity of the interaction with the specific devices is left to the virtual machine monitor. Fortunately, we designed the virtual machine monitor's internal device driver interface to simplify the integration of existing drivers written for commodity operating systems. Disco uses IRIX's original device drivers.

Changes to the HAL

Having to take a trap on every privileged register access can cause significant overheads when running kernel code such as synchronization routines and trap handlers that frequently access privileged registers. To reduce this overhead, we patched the HAL of IRIX to convert these frequently used privileged instructions to use non-trapping load and store instructions to a special page of the address space that contains these registers. This optimization is only applied to instructions that read and write privileged registers without causing other side-effects. Although for this experiment we performed the patches by hand to only a few critical locations, the patches could easily be automatically applied when the privileged instruction first generates a trap. As part of the emulation process, Disco could overwrite certain instructions with the special load and store so it would not suffer the overhead of the trap again.

To help the monitor make better resource management decisions, we have added code to the HAL to pass hints to the monitor giving it higher-level knowledge of resource utilization. We inserted a small number of monitor calls in the physical memory management module of the operating systems. The first monitor call requests a zeroed page. Since the monitor must clear pages to ensure the isolation of virtual machines anyway, the operating system is freed from this task. A second monitor call informs Disco that a page has been put on the operating system's free page list without a chance of reclamation, so that Disco can immediately reclaim the memory.

To improve the utilization of processor resources, Disco assigns special semantics to the reduced power consumption mode of the MIPS processor. This mode is used by the operating system whenever the system is idle. Disco will deschedule the virtual CPU until the mode is cleared or an interrupt is posted. A monitor call inserted in the HAL's idle loop would have had the same effect.

Other Changes to IRIX

For some optimizations Disco relies on the cooperation of the operating system. For example, the virtual network device can only take advantage of the remapping techniques if the packets contain properly aligned, complete pages that are not written. We found that the operating systems networking subsystem naturally meets most of the requirements. For example, it preserves the alignment of data pages, taking advantage of the scatter/gather options of networking devices. Unfortunately, IRIX's mbuf management is such that the data pages of recently freed mbufs are linked together using the first word of the page. This guarantees that every packet transferred by the monitor's networking device using remaps will automatically trigger at least one copy-on-write fault on the receiving end. A simple change to the mbuf freelist data structure fixed this problem.

The kernel implementation of NFS always copies data from the incoming mbufs to the receiving file buffer cache, even when the packet contained un-fragmented, properly aligned pages. This would have effectively prevented the sharing of the file buffer cache across virtual machines. To have clients and servers transparently share the page, we specialized the call to bcopy to a new remap function offered by the HAL. This remap function has the semantics of a bcopy routine but uses a monitor call to remap the page whenever possible. FIG. 5 shows how a data page transferred during an NFS read or write call is first remapped from the source virtual machine to the destination memory buffer (mbuf) page by the monitor's networking device, and then remapped into its final location by a call to the HAL's remap function.

SPLASHOS

A Specialized Operating System

The ability to run a thin or specialized operating system allows Disco to support large-scale parallel applications that span the entire machine. These applications may not be well served by a full function operating system. In fact, specialized operating systems such as Puma (Shuler, 1995) are commonly used to run scientific applications on parallel systems.

To illustrate this point, we developed a specialized library operating system (Kaashoek, 1997), "SPLASHOS", that runs directly on top of Disco. SPLASHOS contains the services needed to run SPLASH-2 applications (Woo, 1995): thread creation and synchronization routines, "libc" routines, and an NFS client stack for file I/O. The application is linked with the library operating system and runs in the same address space as the operating system. As a result, SPLASHOS does not need to support a virtual memory subsystem, deferring all page faulting responsibilities directly to Disco.

Although one might find SPLASHOS to be an overly simplistic and limited operating system if it were to run directly on hardware, the ability to run it in a virtual machine alongside commodity operating systems offers a powerful and attractive combination.

In conclusion, it should be emphasized that many specifics in the above detailed description many be varied without departing from the scope of the invention. Such variations will be obvious to those skilled in the art in view of the invention as described. For example, the implementation described for illustrary purposes with this invention contains elements that are specific to the virtualization of the MIPS processor. The invention may however be easily incorporated in a virtual machine monitor written for another instruction set architecture by someone trained in the art.

REFERENCES

Accetta et al. 1986. Mach: A New Kernel Foundation for UNIX Development. In *Proceedings of the Summer*1986

*USENIX Technical Conference and Exhibition.* USENIX Assoc., Berkeley, Calif.

Bolosky et al. 1989. Simple but effective techniques for NUMA memory management. In Proceedings of the 12th ACM Symposium on Operating System Principles. ACM, New York, 19–31.

Bressoud et al. 1996. Hypervisor-based fault tolerance. *ACM Transactions on Computer Systems*14, 1, 80–107.

Brewer et al. 1997. The evolution of the HP/Convex Exemplar. In *Proceedings of COMPCON Spring '97*, 81–96.

Cormen et al. 1990. *Introduction to Algorithms*, McGraw-Hill, New York.

Cox et al. 1989. The implementation of a coherent memory abstraction on a {NUMA} multiprocessor: experiences with PLATINUM. In *Proceedings of the12th ACM Symposium on Operating System Principles*, ACM, New York, 32–44.

Creasy, R. 1981. The origin of the VM/370 time-sharing system. *IBM J. Res. Develop*, 25, 5, 483–490.

Custer, H. 1993. *Inside Windows NT*. Microsoft Press, Redmond, Wash.

Ebcioglu et al. *1997*. DAISY: Dynamic compilation for 100% architectural compatibility. In *Proceedings of the 24th International Symiposium on Computer Architecture*, 26–37.

Engler et al. 1995. Exokemel: an operating system architecure for application-level resource management. In *Proceedings of the15th ACM Symposium on Operating Systems Principles*, ACM, New York.

Ford et al. 1996. Microkernels meet recursive virtual machines. In *2nd Symposium on Operating Systems Design and plementation*, 137–151.

Goldberg, R. P. 1974. Survey of virtual machine research. *IEEE CoIMput*. 7, 6, 34–45.

Herlihy, M. 1991. Wait-free synchronization. *ACM Trans. on Program. Lang. Syst*. 13, 1, 124–149.

IBM. 1972. IBM Virtual Machine/370 Planning Guide. IBM Corp., Armonk, N.Y.

Kaashoek et al. 1997. Application performance and flexibility on exokernel systems. In *Proceedings of the 16thACM Symposium on Operating Systems Principles*. ACM, New York.

King, A. 1995. *Iside Windows 95*. Microsoft Press, Redmond, Wash.

Kuskin et al. 1994. The Stanford FLASH Multiprocessor. In *Proceedings of the21st International Symposium on Computer Architecture*. 302–313.

Laudon, et al. 1997. The SGI Origin: A ccNUMA highly scalable server. In *Proceedings of the24th Annual International Symposium on Computer Architecture*. 241–251.

Lovett et al. 1996. STiNG: A CC-NUMA computer system for the commercial marketplace. In *Proceedings of the23rd Annual International Symposium on Computer Architecture*. 308–317.

Perez, M. 1995. Scalable hardware evolves, but what about the network OS? In *PCWeek* (December).

Perl et al. 1996. Studies of windows NT performance using dynait execution traces. In *Proceedings of the Second Symposium on Operating System Design and Implementation*. 169–184.

Rosenblum et al. 1997. Using the simOS machine simulator to study complex computer systems. *ACM Transactions on Modeling and Computer Simulation*. 7, 1 (January), 78–103.

Rosenblum et al. 1995. The impact of architectural trends on operating system performance. In *Proceedings of the FIfteenth ACM Symposium on Operating Systems Principles*. ACM, New York, 285–298.

Rosenblum et al. 1996. Implementing efficient fault containment for multiprocessors: confining faults in a shared-memory multiprocessor environment. *Communications of the ACM*. 39, 9 (September), 52–61.

Shuler et al. 1995. The Puma operating system for massively parallel computers. In *Proceedings of the Intel Supercomputer User Group Conference*.

Unrau et al. 1995. Hierarchical clustering: A structure for scalable multiprocessor operating system design. *Journal of Supercomputing*. 9, 1/2, 105–134.

Verghese et al. 1996. Operating system support for improving data locality on CC-NUMA. In *Proceedings of the Seventh International Conference on Architectural Support for Programming Languages and Operating Systems*. ACM, New York, 279–289.

Woo et al. 1995. The SPLASH-2 programs: Characterization and methodological considerations. In *Proceedings of the22nd Annual International Symposium on Computer Architecture*. 24–36.

We claim:

1. A computational system comprising:

a multiprocessor hardware layer comprising a plurality of functionally independent computer processors, a plurality of physical resources, including a hardware machine memory, accessible by the processors, and an interconnect providing mutual communication between the processors and resources;

a virtual machine monitor (VMM) layer executing directly on the hardware layer, wherein the VMM layer comprises a resource manager that manages the physical resources of the multiprocessor, a processor manager that manages the computer processors, and a hardware emulator that creates and manages a plurality of independent virtual machines;

each virtual machine having at least one virtual processor, an associated virtual machine memory, and an associated operating system;

the resource manager including:
  a global memory manager grouping the hardware machine memory into at least private portions that are associated exclusively with respective ones of the virtual machines, and shared portions that are addressable by a plurality of the virtual machines,
  a virtualization sub-system means:
    for virtualizing the virtual machine memory of each virtual machine;
    upon attempted write access by any of the virtual machines to a shared portion, for allocating and associating with the virtual machine, via the global memory manager, a private portions having identical content as the shared portion for which write access was requested;

the plurality of independent virtual machines thereby transparently sharing the hardware machine memory by having concurrent access to the shared portions of the hardware machine memory.

2. The system of claim 1 wherein the VMM layer further comprises a virtual network device providing communication between the operating systems executing on the virtual machines, and allowing for transparent sharing optimizations between a sender operating system and a receiver operating system.

3. The system of claim 2 wherein the resource manager maintains a global buffer cache that is transparently shared among the virtual machines using read-only mappings in portions of an address space of the virtual machines.

4. The system of claim 1 wherein the resource manager further includes at least one copy-on-write disk transparently shared and accessible by the plurality of the virtual machines, the global resource manager further maintaining a mapping of previously accessed disk portions and their corresponding locations as shared portions of the hardware machine memory.

5. The system of claim 4 wherein the resource manager maintains a global buffer cache that is transparently shared among the virtual machines using read-only mappings in portions of an address space of the virtual machines.

6. The system of claim 1 wherein the VMM layer performs dynamic page migration/replication that hides distributed characteristics of the physical resources from the operating systems, wherein the physical resources comprise memory resources.

7. The system of claim 1 wherein the operating systems comprise commodity operating systems.

8. The system of claim 1 wherein the VMM layer further comprises a virtual memory resource interface to allow processes running on multiple virtual machines to share memory.

9. A method implemented on a multiprocessor hardware layer comprising a plurality of functionally independent computer processors, a plurality of physical resources, including a hardware machine memory, accessible by the processors, and an interconnect providing mutual communication between the processors and resources, the method comprising:

executing a virtual machine monitor (VMM) layer directly on the hardware layer, wherein the executing VMM layer comprises managing the physical resources of the multiprocessor with a resource manager, managing the computer processors with a processor manager, and creating and managing a plurality of independent virtual machines with a hardware emulator, each virtual machine having at least one virtual processor, an associated virtual machine memory, and an associated operating system;

grouping the hardware machine memory into at least private portions that are associated exclusively with respective ones of the virtual machines, and shared portions that are addressable by a plurality of the virtual machines;

virtualizing the virtual machine memory of each virtual machine; and upon attempted write access by any of the virtual machines to a shared portion, allocating and associating with the virtual machine a private portion having identical content as the shared portion for which write access was requested;

the plurality of independent virtual machines thereby transparently sharing the hardware machine memory by having concurrent access to the shared portions of the hardware machine memory.

10. The method of claim 9 further comprising providing communication between the operating systems executing on the virtual machines, and allowing for transparent sharing optimizations between a sender operating system and a receiver operating system.

11. The method of claim 10 further comprising maintaining a global buffer cache that is transparently shared among the virtual machines using read-only mappings in portions of an address space of the virtual machines.

12. The method of claim 9 further comprising:

maintaining at least one copy-on-write disk accessible by the plurality of virtual machines;

transparently sharing main memory resources and disk storage resources among the plurality of virtual machines; and maintaining a mapping of previously accessed disk portions and their corresponding locations as shared portions of the hardware machine memory.

13. The method of claim 12 further comprising transparently sharing a global buffer cache among the virtual machines by using read-only mappings in portions of an address space of the virtual machines.

14. The method of claim 9 further comprising providing dynamic page migration/replication that hides distributed characteristics of the physical resources from the operating systems, wherein the physical resources comprise memory resources.

15. The method of claim 9 wherein the operating systems comprise commodity operating systems.

16. The method of claim 9 further comprising allowing processes running on multiple virtual machines to share memory through the use of a virtual memory resource interface.

* * * * *